United States Patent
Jadav et al.

(10) Patent No.: US 6,279,138 B1
(45) Date of Patent: Aug. 21, 2001

(54) SYSTEM FOR CHANGING THE PARITY STRUCTURE OF A RAID ARRAY

(75) Inventors: Divyesh Jadav, Campbell; Deepak R. Kenchammana-Hosekote, Sunnyvale; Jaishankar Moothedath Menon, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,012

(22) Filed: Aug. 4, 1998

(51) Int. Cl.$^7$ .................................................. G06F 11/00
(52) U.S. Cl. ........................ 714/800; 714/770; 711/114
(58) Field of Search ............................... 714/800, 3, 11, 714/13, 15, 7, 6, 770; 711/114, 162, 122; 707/205

(56) References Cited

U.S. PATENT DOCUMENTS

| | | |
|---|---|---|
| 4,654,819 * | 3/1987 | Stiffler et al. .................. 711/162 |
| 4,733,352 | 3/1988 | Nakamura et al. . |
| 4,907,232 * | 3/1990 | Harper et al. .................. 714/3 |
| 4,916,605 | 4/1990 | Beardsley et al. . |
| 5,140,592 | 8/1992 | Idleman et al. . |
| 5,155,729 * | 10/1992 | Rysko et al. .................. 714/11 |
| 5,208,813 | 5/1993 | Stallmo . |
| 5,293,618 | 3/1994 | Tandai et al. . |
| 5,301,297 | 4/1994 | Menon et al. .................. 711/114 |
| 5,373,512 | 12/1994 | Brady . |
| 5,375,128 | 12/1994 | Menon et al. . |
| 5,437,022 | 7/1995 | Beardsley et al. . |
| 5,490,248 | 2/1996 | Dan et al. . |
| 5,499,337 | 3/1996 | Gordon . |

(List continued on next page.)

OTHER PUBLICATIONS

Cao, P. et al., "The TicketTAIP Parallel RAID Architecture", *ACM Transactions on Computer Systems*, vol. 12, No. 3, pp. 236–269 (Aug. 1994).

Chen, P. et al., "RAID: High–Performance, Reliable Secondary Storage", *ACM Computing Surveys*, vol. 26, No. 2, pp. 145–185 (Jun. 1994).

IBM Brochure, "SSA RAID Adapter for PC Servers", pp. 1–2, © International Business Machines Corporation 1996.

IBM Manual, "IBM PC ServeRAID Adapter—84H7117 Installation Instructions and User's Guide", 77 pages, First Edition(Jan. 1997).

(List continued on next page.)

*Primary Examiner*—Albert Decady
*Assistant Examiner*—David Ton
(74) *Attorney, Agent, or Firm*—Merchant, Gould, Smith, Edell, Welter & Schmidt; Altera Law Group, LLC

(57) ABSTRACT

Disclosed is a system for altering the structure of parity groups, e.g., altering the RAID level or number of storage devices included in the RAID array. A parity group consists of a set of data blocks and parity data for the data blocks. The data and parity data are stored in at least two storage devices. The first processing unit alters the parity structure of an Nth set of parity groups, wherein N is an integer value greater than or equal to zero. A set of parity groups includes at least one parity group. The second processing unit determines an Nth range of parity groups including the Nth set of parity groups. After detecting the failure of the first processing unit while altering the parity structure of the parity groups in the Nth set, the second processing unit processes the parity groups in the determined Nth range to determine a parity group whose parity structure was being altered when the first processing unit failed.

25 Claims, 5 Drawing Sheets

U.S. PATENT DOCUMENTS

| | | | |
|---|---|---|---|
| 5,526,482 | | 6/1996 | Stallmo et al. .......................... 714/6 |
| 5,530,830 | | 6/1996 | Iwasaki et al. ...................... 711/114 |
| 5,530,948 | | 6/1996 | Islam . |
| 5,546,535 | | 8/1996 | Stallmo et al. . |
| 5,572,660 | | 11/1996 | Jones ........................................ 714/6 |
| 5,574,863 | | 11/1996 | Nelson et al. . |
| 5,574,882 | | 11/1996 | Menon et al. ...................... 711/114 |
| 5,636,359 | | 6/1997 | Beardsley et al. ................... 711/122 |
| 5,640,530 | | 6/1997 | Beardsley et al. . |
| 5,664,187 | | 9/1997 | Burkes et al. ...................... 707/205 |
| 5,737,514 | * | 4/1998 | Stiffler .................................. 714/13 |
| 5,751,939 | * | 5/1998 | Stiffler .................................. 714/15 |
| 5,787,460 | | 7/1998 | Yashiro et al. . |
| 5,809,224 | * | 9/1998 | Schultz et al. .......................... 714/7 |
| 5,813,016 | | 9/1998 | Sumimoto . |
| 5,848,229 | | 12/1998 | Morita . |
| 5,875,456 | * | 2/1999 | Stallmo et al. ...................... 711/114 |
| 5,913,227 | | 6/1999 | Raz et al. . |
| 5,999,930 | | 12/1999 | Wolff . |
| 6,073,218 | | 6/2000 | DeKoning et al. . |

OTHER PUBLICATIONS

IBM Brochure, "3527 SSA Storage Subsystem for PC Servers", pp. 1–2, © International Business Machines Corporation 1997.

IBM Brochure, "IBM PC ServeRAID Adds Two New Features", *IBM Personal computing solutions*, 12 pages- (Dec. 16, 1997).

IBM Brochure, "IBM PC Server 704", *IBM Product Summaries, Personal Computing in Canada*, pp. 1–6, Last Published Jan. 16, 1998.

IBM Brochure, "SSA RAID Adapter for PCI", *IBM Storage*, pp. 1–5 (Jan. 16, 1998).

IBM Brochure, Serial Storage Architecture (SSA), *IBM Storage*, pp. 1–2 (Jan. 16, 1998).

IBM Spec Sheet, "PC Server Serial Storage Architecture (SSA) RAID Adapter Spec Sheet", *IBM Personal Computing, Canada*, p. 1, Last Published Nov. 1, 1998.

Hewlett Packard Brochure, "Dynamic RAID Technology From Hewlett–Packard Addresses Issues in Current High Availability", *Hewlett Packard, Enterprise Storage Solutions Division*, pp. 1–6 (Revised Apr. 1997).

Hewlett Packard Brochure, "What are Disk Arrays?", *Information Storage*, pp. 1–11 (Jan. 15, 1998).

Judd, I., et al., "Serial Storage Architecture", *IBM Journal of Research & Development*, vol. 40, No. 6—Nontopical issue, pp. 1–14 (Jan. 16, 1998).

Menon, J. et al., "Algorithms for Software and Low–cost Hardware RAIDSs", *IEEE*, pp. 411–418 (1995).

Menon, J., "Performance of RAID5 Disk Arrays with Read and Write Caching", *Distributed and Parallel Databases*, vol. 2, pp. 261–293 (1994).

Menon, J. et al., "The Architecture of a Fault–Tolerant Cached RAID Controller", *Computer Science, Research Report*, pp. 1–28 (Jan. 22, 1993).

MYLEX Manual "DAC960SX Family User Guide, Ultra–SCSI to Ultra–SCSI RAID Controllers DAC960SX and DAC960SXI", Manual Version 1.0, Part Number 771975–D01, *Mylex*, ©Copyright 1997 Mylex Corporation.

Patterson, D. et al., "A Case for Redundant Arrays of Inexpensive Disks (RAID)", *ACM*, pp. 109–116 (1988).

Riegel, J. et al., "Performance of Recovery Time Improvement Algorithms for Software RAIDs", *IEEE*, pp. 56–65 (1996).

\* cited by examiner

|        | D1 | D2 | D3 |    |           |
|--------|----|----|----|----|-----------|
| Stripe 1 | ①  | 3  | 5  | P1 | ← Parity Group 1 |
|        | ②  | 4  | 6  | P2 | ← Parity Group 2 |
| Stripe 2 | 7  | 9  | 11 | P3 |           |
|        | 8  | 10 | 12 | P4 |           |
|        | 13 | 15 |    | P5 |           |
|        | 14 | 16 |    | P6 |           |

*FIG. 4*

SYSTEM FOR CHANGING THE PARITY STRUCTURE OF A RAID ARRAY

CROSS-REFERENCE TO RELATED APPLICATIONS

This application is related to the following co-pending and commonly-assigned patent applications, all of which are filed on the same date herewith, and all of which are incorporated herein by reference in their entirety:

"Distributed Storage System Using Front-End And Back-End Locking," by Jai Menon, Divyesh Jadav, Kal Voruganti, Serial No. 09/129,004;

"System for Updating Data in a Multi-Adaptor Environment," by Jai Menon, Divyesh Jadav, Deepak Kenchammana-Hosekote, Serial No. 09/128,547;

"Updating And Reading Data And Parity Blocks In A Shared Disk System," by Jai Menon, Serial No. 09/129,067;

"Updating Data and Parity With and Without Read Caches," by Jai Menon, Serial No. 09/128,438; and "Updating and Reading Data and Parity Blocks in a Shared Disk System with Request Forwarding," by Jai Menon and Divyesh Jadav, Serial No. 09/128,754.

BACKGROUND OF THE INVENTION

1. Field of the Invention

The present invention relates to a system for changing the parity structure of data in a shared storage device system and, in particular, altering the parity structure of a RAID array.

2. Description of the Related Art

In Redundant Arrays of Independent Disks (RAID) systems, data files and related parity are striped across multiple disk drives. In storage subsystems which manage numerous hard disk drives as a single direct access storage device (DASD), the RAID logic is implemented in the controller of the subsystem. RAID storage methodologies have also been implemented in software for execution on a single host computer. This allows the single host computer, such as a personal computer, to implement RAID storage techniques on local hard disk drive space. Such software RAID methodologies are described in "Algorithms for Software and Low Cost Hardware RAIDs," by Jai Menon, Jeff Reigel, and Jim Wyllie, Document No. 1063-6390/95, pgs. 411–418 (IEEE 1995).

One technique for altering the arrangement of logical drives in a storage subsystem requires that the RAID array to be taken off-line to back-up the data in order to delete the logical drive or array, create new logical drives/arrays, format the storage space, and then, finally, restore the data. The PC ServeRAID SCSI adaptor from International Business Machines Corporation ("IBM®"), the assignee of the present patent application, offers logical drive migration (LDM). "IBM" is a registered trademark of IBM, and "ServeRAID" is a trademark of IBM. The LDM feature allows a single IBM PC ServeRAID SCSI adaptor to alter the structure of a RAID array by altering the RAID level or adding or removing a storage device, e.g., hard disk drive, to increase or decrease the size of the current array. Integrating one or more new hard disks into an existing array increases the size of all logical drives in the array. The IBM PC ServeRAID SCSI adaptor can concurrently service input/output requests to data in the RAID array involved in logical drive migration (LDM) activities, i.e., having their RAID level changed or distributing the current RAID level across a different number of disk drives.

As networks increase in size, an adaptor can be overburdened with I/O requests to a storage device managed by the adaptor. Moreover, if the IBM PC ServeRAID SCSI adaptor is performing logical drive migration (LDM) activities, the adaptor will take longer to service I/O requests to the storage device.

SUMMARY OF THE INVENTION

To overcome the limitations in the prior art described above, preferred embodiments of the present invention disclose a system for altering the structure of parity groups. A parity group consists of a set of data blocks and parity data for the data blocks. The data and parity data are stored in at least two storage devices. For each N, wherein N is an integer value greater than or equal to zero, a first processing unit alters the parity structure of the Nth set of parity groups. A set of parity groups includes at least one parity group. A second processing unit determines an Nth range of parity groups including the Nth set of parity groups. Upon the second processing unit detecting the failure of the first processing unit while altering the parity structure of the parity groups in the Nth set, the second processing unit processes the parity groups in the determined Nth range to determine a parity group whose parity structure was being altered when the first processing unit failed.

In further embodiments, altering the parity structure comprises at least one of: changing the RAID level of the parity structure, adding a storage device to increase the storage capacity, and removing a storage device to decrease the storage capacity.

In yet further embodiments, should the first processing unit fail, the second processing unit alters the parity structure for the determined parity group whose parity structure was being altered when the first processing unit failed and parity groups whose parity structure was not altered by the first processing unit.

The preferred embodiments provide a system of at least two adaptors involved in altering the parity structure of a data array, such as a RAID array. In preferred embodiments, the adaptor not changing the parity structure, e.g., the secondary adaptor, as well as the adaptor changing the parity structure, e.g., the primary adaptor, can handle input/output requests to the data array. Moreover, with the preferred embodiments, the secondary adaptor knows within a range how far the primary adaptor progressed in altering the parity structure of parity groups. The secondary adaptor can complete altering the structure of the parity groups based on such information when the primary adaptor fails.

BRIEF DESCRIPTION OF THE DRAWINGS

Referring now to the drawings in which like reference numbers represent corresponding parts throughout:

FIG. 4 illustrates an alternative arrangement of a parity structure; and

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
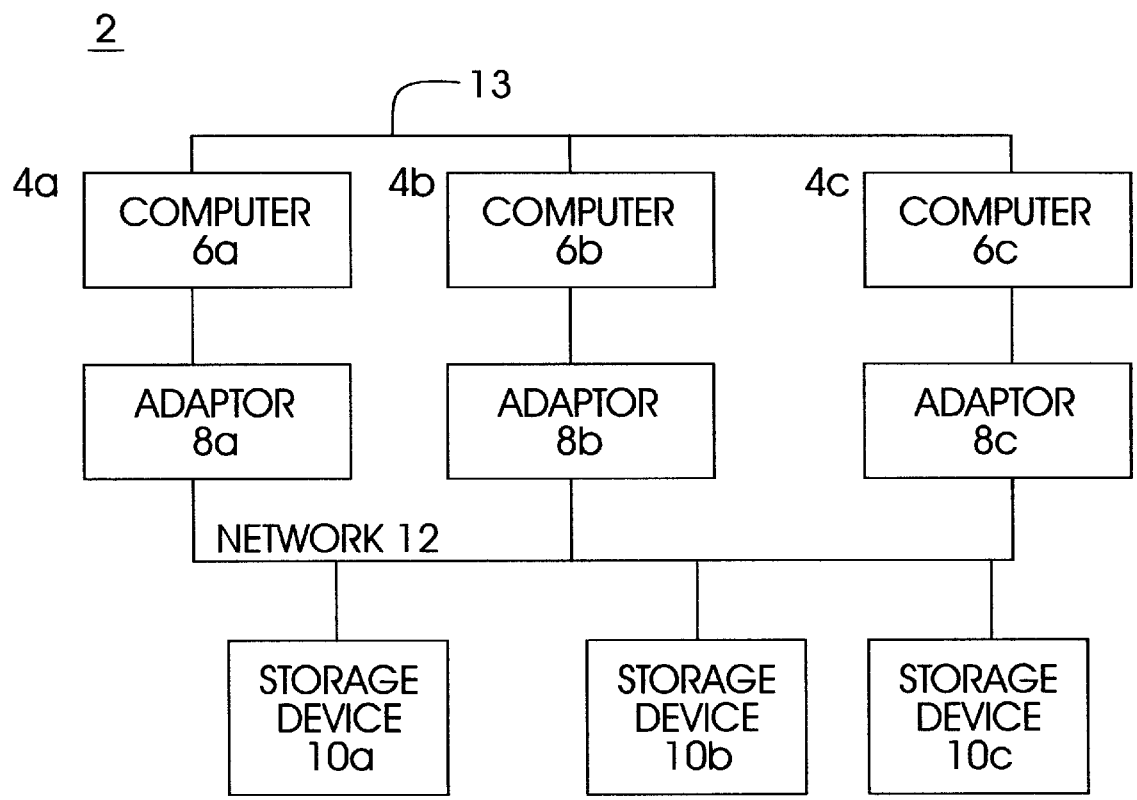
FIG. 1 illustrates a preferred hardware and software environment in which preferred embodiments of the present invention are implemented.

FIG. 1 illustrates a shared device environment comprised of nodes 4a, b, c. Each node includes a computer 6a, b, c, i.e., central processing unit, and an adaptor card 8a, b, c. A plurality of storage devices 10a, b, c interface via a network 12 to the adaptor cards 8a, b, c and attached computers 6a, b, c. The computer 6a, b, c may be a personal computer, workstation, mainframe, etc. The adaptor cards 8a, b, c interface with their respective computers 6a, b, c via a PC bus, such as the PCI bus, and include one or more disk interface ports, such as SCSI or Serial Storage Architecture (SSA) ports. The adaptor cards 8a, b, c include logic to execute the RAID algorithms. The storage devices 10a, b, c may be any suitable non-volatile storage device known in the art, including hard disk drives, magnetic tape, optical disks, non-volatile RAM, holographic units, etc. The nodes 4a, b, c and storage devices 10a, b, c interface via the network 12, which is preferably a high speed interconnect, such as SCSI, SSA, SNA, SAN, FDDI, etc. Additionally, the network 12 may be a SCSI or SSA bus. In further embodiments more nodes than shown may be included in the shared device system 2. Each node may include multiple adaptors, multiple processors and/or local (non-shared) storage devices.

FIG. 1 further illustrates an additional network 13 providing an additional communication line among the computers 6a, b, c. This additional network 13 may be comprised of any suitable network known in the art, e.g., ETHERNET, LAN, etc.

In preferred embodiments, the computers 6a, b, c run parallel processing software, such as the ORACLE PARALLEL SERVER™, the MICROSOFT® Wolfpack Clustering System or any other clustering software. ORACLE PARALLEL SERVER is a trademark of Oracle Corporation; MICROSOFT is a registered trademark of Microsoft Corporation. This parallel processing software allows the computers 6a, b, c to share storage devices 10a, b, c such that any node 4a, b, c may access any block in any of the storage devices 10a, b, c. This parallel architecture allows data to be distributed across different storage devices 10a, b, c throughout the shared device system 2. The parallel processing software, implemented in the computers 6a, b, c, may perform logical locking to insure that only one write request is made to a block in any of the storage devices 10a, b, c, at any given time and to insure that an application does not attempt to read a block being modified by another application. To perform logical locking under control of the parallel processing software, the computers 6a, b, c would exchange messages, data, and information via the additional network 13. The adaptors 8a, b, c perform physical locking.

Figure 2:
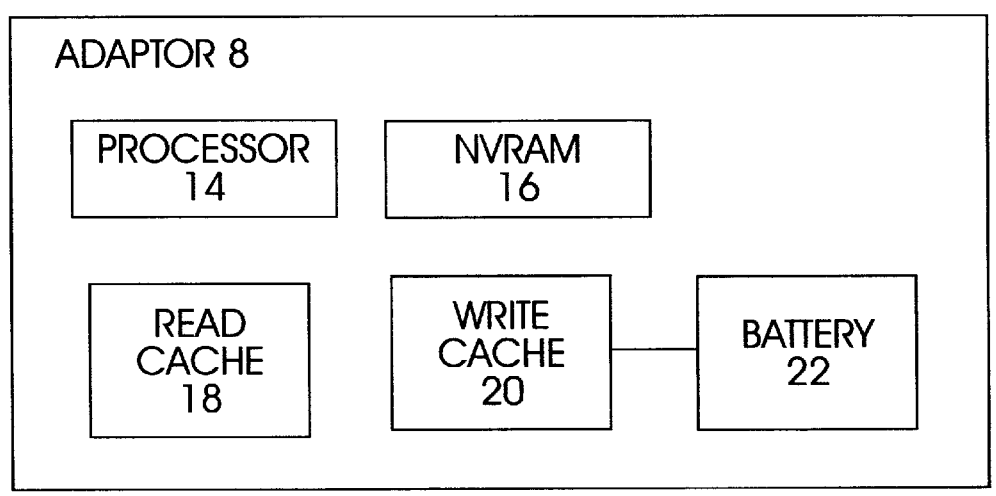
FIG. 2 illustrates a preferred hardware and software architecture of an adaptor in accordance with preferred embodiments of the present invention.

FIG. 2 illustrates a preferred embodiment of the adaptors 8a, b, c. Each adaptor 8a, b, c includes a processor 14a, b, c, a non-volatile RAM 16a, b, c for storing control information, a read cache 18a, b, c, and a write cache 20a, b, c. The read 18a, b, c and write 20a, b, c caches may be comprised of volatile memory, such as RAM, or a non-volatile memory unit, e.g., non-volatile RAM. In certain embodiments, the read cache 18a, b, c and write cache 20a, b, c may be areas within the same memory device or located within separate memory devices. In further embodiments, there may be no read 18a, b, c and/or write 20a, b, c caches. In preferred embodiments, the write caches 20a, b, c contain dirty blocks, which is data intended for a block in the storage device 10a, b, c that is more recent than the block actually maintained in the storage device 10a, b, c. Once the data is written from the write cache 20a, b, c to the storage device 10a, b, c, the copy of the data in the cache is "clean." Because the write cache 20a, b, c only maintains "dirty" blocks, the clean copy in the cache after the update is considered to be in the read cache 18a, b, c, not the write cache 10a, b, c anymore. The components of the adaptors 8a, b, c may be implemented as PC cards such the PC ServeRAID SCSI adaptor from IBM. Alternatively, components and functionality of the adaptors 8a, b, c could be implemented in the computers 6a, b, c.

In certain embodiments, the read cache 18a, b, c may be implemented in a volatile memory device, e.g., DRAM, RAM, etc., and the write cache 20a, b, c may be attached to a battery 22 which makes the write cache 20a, b, c a non-volatile memory device. In such case, an update to a block is initially written in both the RAM (read cache) and the battery 22 backed up write cache 20a, b, c. Once the dirty data is destaged to the storage device 10a, b, c, the copy from the write cache 20a, b, c is marked as invalid for later removal, leaving only the clean copy in the RAM, i.e., read cache. In alternative embodiments, the dirty data may be sent to all other adaptors in the system to invalidate any stale data in their caches. In embodiments with only a single memory device for the read 18a, b, c and write 20a, b, c caches, the data is considered to be in the write cache 20a, b, c prior to destaging and in the read cache 18a, b, c after destaging even though the data remains in the same memory device.

Parity in a RAID Environment

Figure 3A:
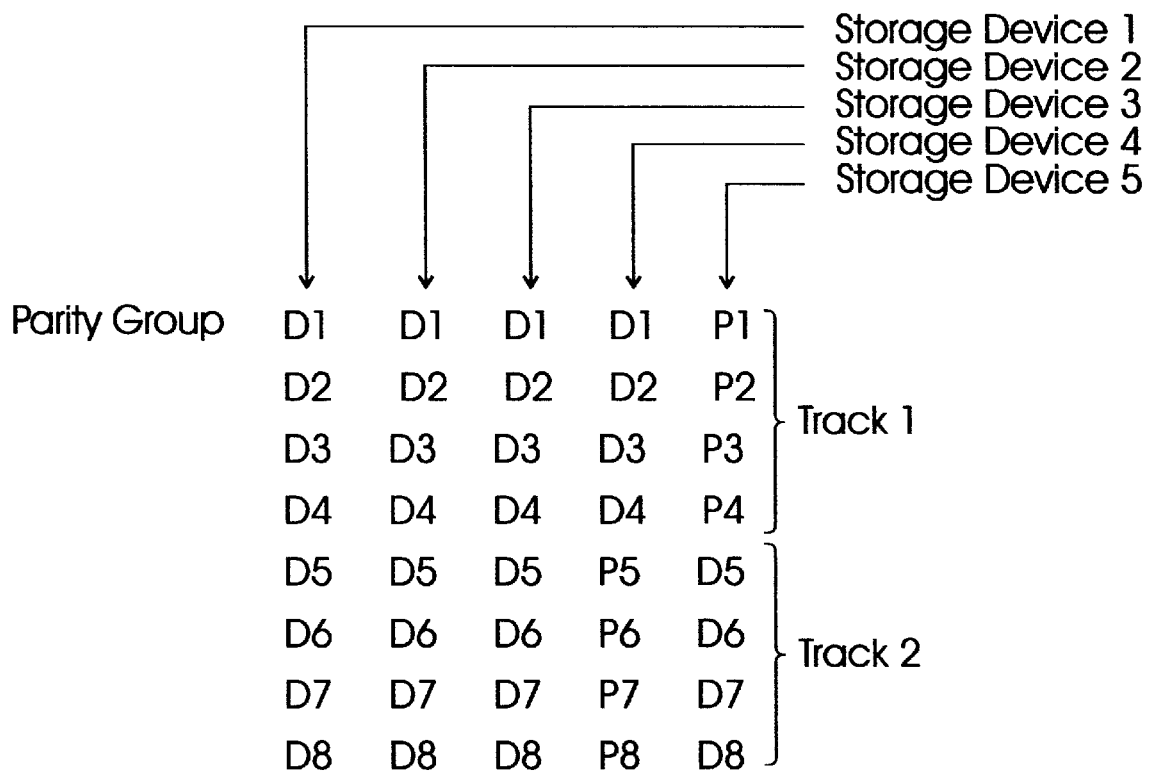
FIGS. 3a and b illustrate embodiments of how data and parity blocks are arranged on storage devices.

FIG. 3a illustrates a 4+P RAID disk array in which a parity block $P_i$ protects four data blocks $D_i$ in four storage devices. Each vertical column represents a storage device. A parity group is a row in the illustration of FIG. 3a that consists of four data blocks $D_i$, one in each storage device, and a parity block $P_i$ maintaining parity information for the four data blocks $D_i$. A parity value $P_i$ is the exclusive OR of the data blocks $D_i$ in the same parity group of a given i. If a disk fails, then the data can be recreated by processing the parity block ($P_i$) and the remaining data blocks $D_i$ for the parity group. FIG. 3a further shows the rotation of parity in that parity blocks $P_5$ through $P_8$ are on a different disk, storage device 4, than the previous parity blocks which are on storage device 5.

In preferred embodiments, a parity block can be updated with the following exclusive OR operation, where the new parity ($P_i'$)=(old data ($D_i$) XOR new data ($D_i'$) XOR old parity ($P_i$).

Figure 3B:

In certain embodiments, data may be stored in "stripe units" on the storage devices. FIG. 3b illustrates a "stripe unit" of data. A stripe unit consists of multiple consecutive blocks of data on a storage device. The "stripe unit" shown in FIG. 3b has two consecutive blocks of data, blocks 1 and 2. A "stripe" consists of multiple stripe units. The "stripe" shown in FIG. 3b has five stripe units. In the exemplar of FIG. 3b, a stripe unit includes blocks from two parity groups throughout each storage device. In alternative embodiments a "stripe unit" and "stripe" could be defined in alternative manners, e.g., including more than two blocks of data, depending on the number of storage devices and parity groups.

In alternative embodiments, other parity schemes may be utilized, such as mirrored RAID, bit-interleaved parity, block-interleaved distributed-parity or P+Q redundancy, etc. These various RAID schemes are discussed in "RAID: High-Performance, Reliable Secondary Storage," by Peter M. Chen, Edward K. Lee, Garth A. Gibson, Randy H. Katz, and David A. Patterson, published in ACM Computing Surveys, Vol. 26, No. 2, pgs. 145–185 (June, 1994), which publication is incorporated herein by reference in its entirety.

Logical Drive Migration

As discussed, logical drive migration (LDM) is a process which changes the parity structure of a RAID array (1) by altering the RAID level, e.g., from a RAID 5 to RAID 0 level, or (2) by adding or removing storage devices 10a, b, c to the current RAID level to increase or decrease the array capacity. If there is only one adaptor 8a, then alteration proceeds sequentially from parity group to parity group, rearranging how data blocks in a parity group are distributed across the storage devices 10a, b, c and where parity data for the parity group is stored. In the single adaptor 8a case, the single adaptor 8a maintains a high-water mark indicating which parity group is being sequentially updated. Requests to parity groups prior to the current parity group being updated are handled using the new RAID structure and requests subsequent to the currently updated group are handled using the old RAID structure. The NVRAM 16a stores completed intermediate steps involved in the transformation of the RAID structure, including the high-water mark value, and the type of structural change being implemented. The information maintained in the NVRAM 16a is sufficient such that if adaptor 8a fails, the NVRAM 16a can be detached and moved to a replacement adaptor, e.g., adaptor 8b, to continue the transformation of the RAID structure.

In preferred embodiments, there are two adaptors, e.g., adaptors 8a, b, involved in the RAID transformation. Initially, only one adaptor, referred to as the primary adaptor 8a will change the parity structure. The primary adaptor 8a and the other adaptor, referred to as the secondary adaptor 8b, both process input/output requests to data in parity groups in the array subject to the structural changes. The primary adaptor 8a maintains the high-water mark indicating the specific parity group involved in the current transformation because the primary adaptor 8a is executing the transformation. In preferred embodiments, the secondary adaptor 8b maintains a high-water mark range spanning the actual high-water mark. The range maintained by the secondary adaptor 8b is defined by a low-end and high-end. The secondary adaptor 8b further maintains the array of parity groups involved in the structural transformation and the transformation being implemented. The primary adaptor 8a would include logic known in the art to change the parity structure for a set of parity groups, such as the logic included in the IBM PC ServeRAID adaptor which performs the tasks of altering the parity structure and handling input/output requests to the RAID array being modified.

To reduce message requests, the primary adaptor 8a may only communicate with the secondary adaptor 8b intermittently. For instance, the primary adaptor 8a may communicate after transforming the parity structure of half the parity groups in the range between the high and low-water mark, e.g., 100 parity groups. The secondary adaptor 8b maintains the high and low-water mark that includes the current parity group being transformed.

FIG. 4 illustrates how the parity structure may be altered by removing a storage device from the parity scheme. FIG. 3b illustrates a 4+P parity structure, where data is stored in consecutive blocks in a storage device $D_i$, and each parity group $P_i$ maintains parity data for four storage devices $D_i$. FIG. 4 illustrates a 3+P parity structure, where each parity group maintains parity for three storage devices $D_1, D_2, D_3$. Thus, altering the structure would involve first altering how data is distributed across storage devices. After determining the distribution of data across storage devices, the parity block $P_i$ for a particular data block across the storage devices $D_i$ may then be calculated.

Figure 5A:
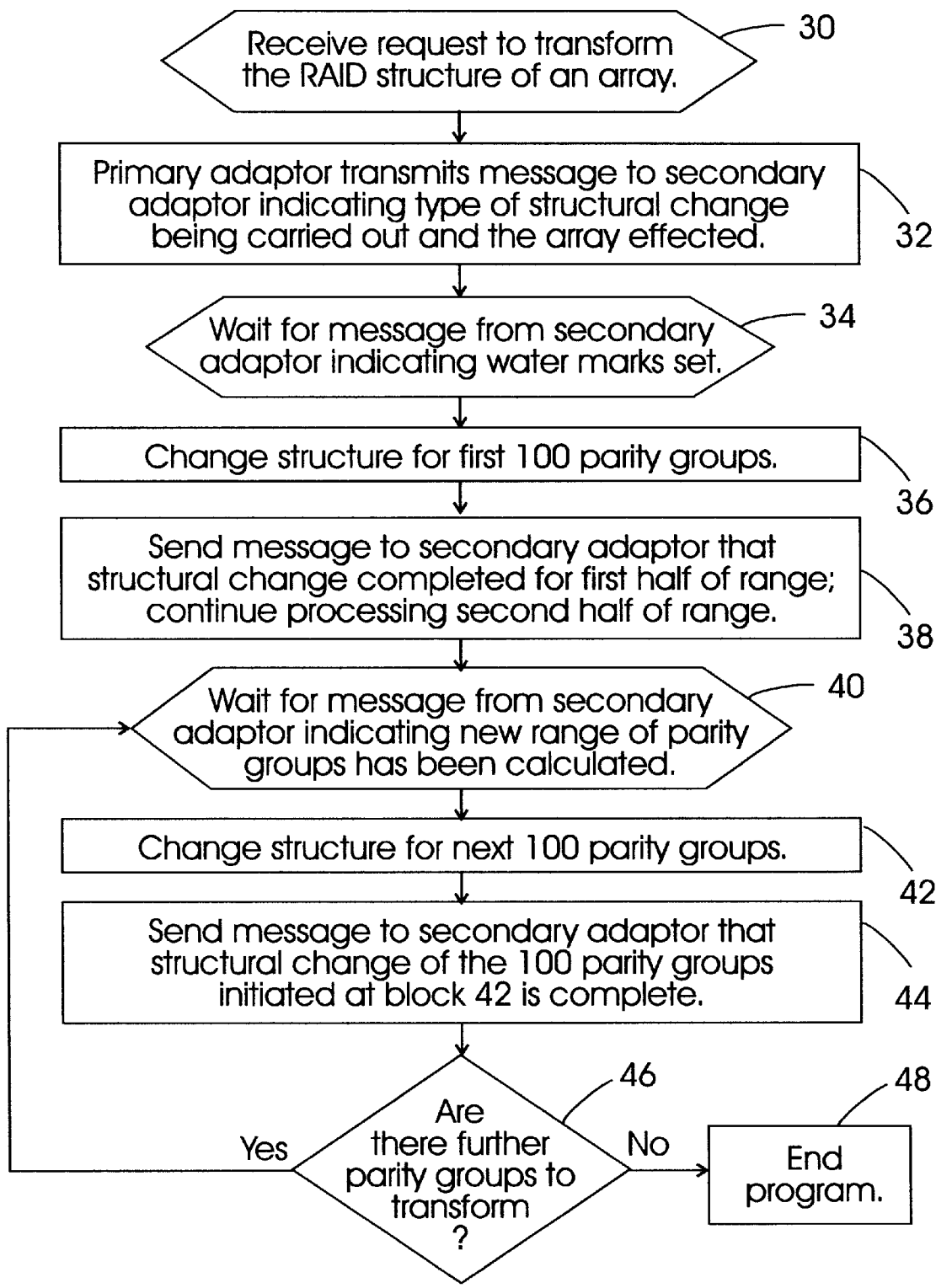
FIGS. 5a, b illustrates logic to alter the parity structure in accordance with preferred embodiments of the present invention.
Figure 5B:
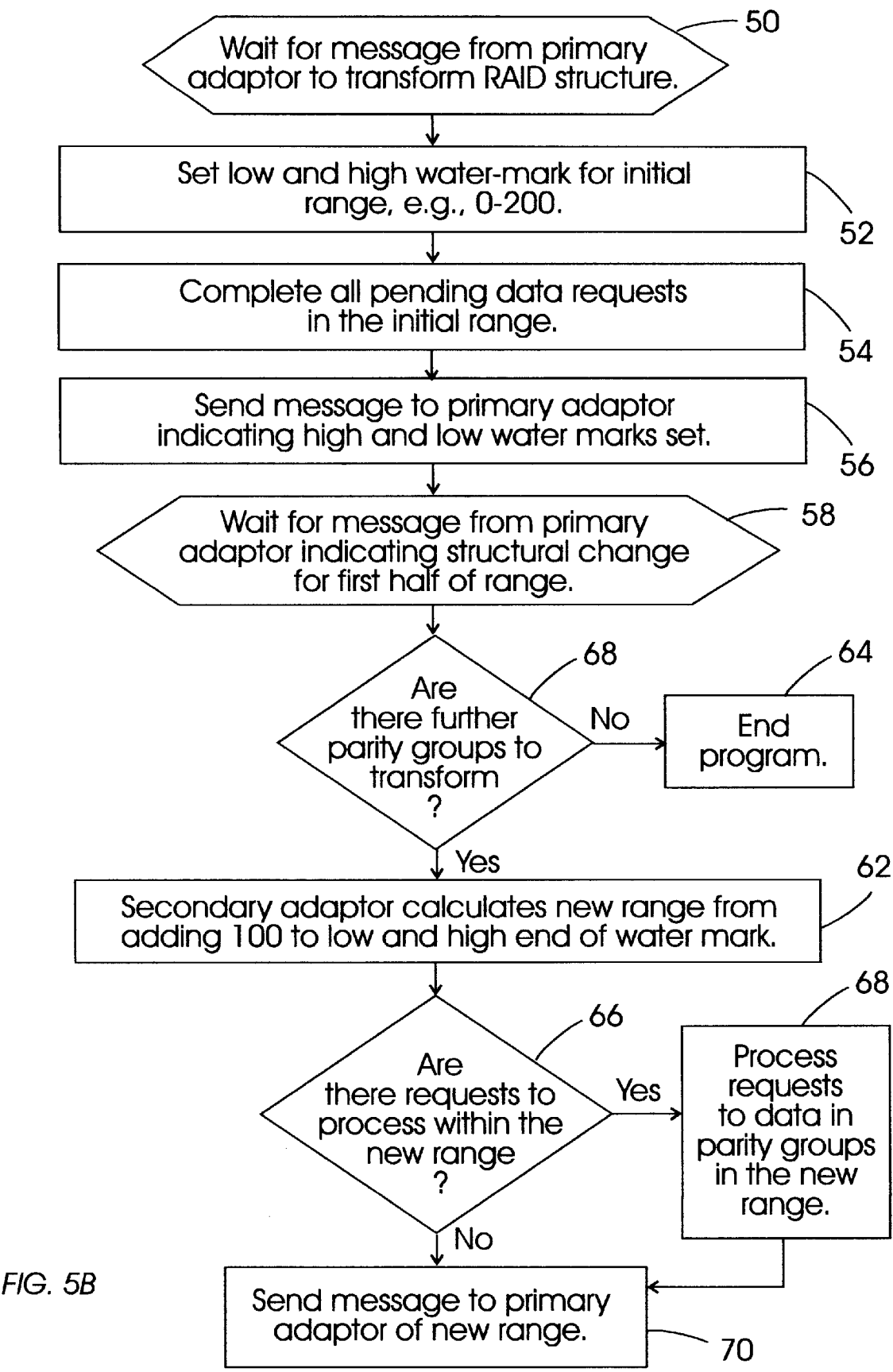

FIG. 5a illustrates logic implemented in the primary adaptor 8a and FIG. 5b illustrates logic implemented in the secondary 8b adaptor for transforming the RAID structure of an array of parity groups. Each adaptor 8a, b would include the logic of both FIGS. 5a, b, thereby rendering each adaptor 8a, b capable of functioning as the primary or secondary adaptor. The logic of FIGS. 5a, b may be hardwired logic implemented in a ROM device accessible to the adaptor processor 14 or may be software code stored elsewhere in the adaptor 8 or computer 6, or some combination of hardwired and software logic. The primary adaptor 8a communicates with the secondary adaptor 8b after transforming the RAID structure of a fixed number of parity groups. The secondary adaptor 8b maintains a high and low-water mark range of parity groups. The secondary adaptor 8b increments the range by the fixed number of parity groups whenever the primary adaptor 8a transforms the parity structure for the fixed number of parity groups. In the exemplar logic of FIGS. 5a, b, the fixed number of parity groups is 100, and the range extends twice the fixed number of parity groups, i.e., 200 parity groups.

For the primary adaptor 8a, logic begins at block 30 which represents the primary adaptor 8a receiving a request to transform the RAID structure of an array of parity groups. Control transfers to block 32 which represents the primary adaptor 8a transmitting a message to the secondary adaptor 8b indicating the type of structural change being carried out and the array to change. Control then transfers to block 34 which represents the primary adaptor 8a waiting for a message from the secondary adaptor 8b indicating that the water marks indicating the range of parity groups to modify has been set. Control transfers to block 36 which represents the primary adaptor 8a changing the RAID structure for the first half of the range in the array, e.g., the first 100 parity groups. Control transfers to block 38 which represents the primary adaptor 8a sending a message to the secondary adaptor 8b indicating the completion of the structural change for the first half of the range. In this way, halfway through the range, at block 38, the primary adaptor 8a notifies the secondary adaptor 8b that the transformation has occurred for half the range. The primary adaptor 8a may then continue processing the parity groups in the second half of the range indicated by the water marks set by the secondary adaptor 8b.

Control transfers to block 40 which represents the primary adaptor 8a waiting for a message from the secondary adaptor 8b indicating the new range of parity groups to transform, which the secondary adaptor 8b calculates. The primary adaptor 8a may have received such a message earlier, e.g., before completing the change of the structure in the next 100 parity groups at block 40. After the message is received at block 40 or earlier, control proceeds to block 42 which represents the primary adaptor 8a changing the RAID structure for the subsequent 100 parity groups. Control transfers to block 44 which represents the primary adaptor 8a sending a message to the secondary adaptor 8b indicating the structural change of the next half of the range, e.g., another 100 parity groups. As in block 38, the primary adaptor 8a may continue processing the parity groups in the second half of the range provided at block 40.

Control then transfers to block 46 which represents the primary adaptor 8a determining whether there are further parity groups to transform. If so, control transfers back to block 40 et seq. to transform the next set of parity groups; otherwise, control transfers to block 48 to end the transformation program. The program ends at block 48 if there are no further parity groups to transform.

FIG. 5b illustrates logic executed by the secondary adaptor 8b for participating in the transformation of the RAID structure of the array in conjunction with the primary adaptor operating under the logic of FIG. 5a. Control begins at block 50 which represents the secondary adaptor 8b waiting for a message from the primary adaptor to transform a RAID structure. Upon receiving indication of such an operation, control proceeds to block 52 which represents the secondary adaptor 8b setting the low and high-water mark indicating a range of a first set of parity groups to transform. For instance, if the primary adaptor 8a indicated that it was going to transform parity groups starting at parity group 0, then the secondary adaptor 8b would calculate an initial range from the starting parity group, e.g., 0–200. Control transfers to block 54 which represents the secondary adaptor 8b completing all pending data requests in the initial range of parity groups to be transformed, e.g., parity groups 0 to 200. Control then transfers to block 56 which represents the secondary adaptor 8b sending a message to the primary adaptor 8a indicating that the initial low and high-water marks have been set.

Control transfers to block 58 which represents the secondary adaptor 8b waiting for a message from the primary adaptor 8a indicating the completion of the structural change for the first half of the range indicated by the low and high-water marks, e.g., the first 100 parity groups. Control transfers to block 60 which represents the secondary adaptor 8b determining if there are further parity groups to transform beyond the range calculated at block 52. If so, control transfers to block 62; otherwise, control transfers to block 64. Block 64 represents the end of the program for the secondary adaptor 8b. Block 62 represents the secondary adaptor 8b forming a new range of parity groups within the high and low-water marks by incrementing the high and low-water marks by a fixed number equal to half the initial range set at block 52, e.g., 100. Control then transfers to block 66 which represents the secondary adaptor 8b determining whether the secondary adaptor 8b has received requests to data within parity groups in the new range of parity groups. If so, control transfers to block 68 which represents the secondary adaptor 8b completing all requests to data within the new range. Otherwise, control transfers to block 70 which represents the secondary adaptor 8b sending a message to the primary adaptor 8a indicating that a new range of parity groups was calculated. After completing all requests at block 68, control transfers to block 70.

In this way, by having the primary adaptor 8a inform the secondary adaptor 8b of the completion of a fixed number of parity groups, the secondary adaptor 8b knows the range of parity groups involved in the transformation. If the primary adaptor 8a fails while transforming the RAID structure, the secondary adaptor 8a "knows" within a fairly narrow range of where the transformation was completed prior to failure.

In the preferred logic of FIGS. 5a, b, the secondary adaptor 8b could determine failure within a 200 parity group range. The secondary adaptor 8b can check the groups within the range of where the failure occurred to locate the true high-water mark. The secondary adaptor 8b knows the type of RAID structural change involved. The secondary adaptor 8b can complete the structural change after determining the high-water mark for the parity group that was being transformed when the primary adaptor 8a failed and all parity groups not yet transformed to the new parity structure. It is possible that the structural change may not be able to occur for the one parity group in which the failure occurred.

After sending the message to the primary adaptor 8a at block 66, the secondary adaptor 8b may receive a request to a parity group. The secondary adaptor 8b would handle such a request as follows. If the requested data is in a parity group that is less than or equal to the low-end water mark in the range, then the secondary adaptor 8b would handle the request as if the requested data was located in the new, transformed RAID structure. If the requested data is in a parity group that is greater than or equal to the high-end of the range, then the secondary adaptor 8b would handle the request as if the requested data was located in the old RAID structure prior to transformation. If the requested data is in a parity group within the range of parity groups being changed, then the secondary adaptor may delay handling the request until the secondary adaptor 8b determines that the requested parity group is less than the low-end range of the parity group range.

In preferred embodiments, if an adaptor were to fail, e.g., adaptor 8a, the NVRAM 16a of the failed adaptor 8a could be placed in a new adaptor. The new adaptor including the NVRAM from the failed adaptor would then continue the transformation of the parity structure where the failed adaptor left off.

If the data in the failed NVRAM 16a cannot be recovered, then the parity data must be rebuilt from one of the surviving adaptors 8b. In such case, if partial parity data is maintained in the NVRAMs 16a, b, c, then the surviving adaptor 8b obtains lock ownership for the parity group before rebuilding the parity, and resetting the lock after rebuilding the parity. After rebuilding is complete, the adaptors 8a, b, c can return to an update algorithm, such as the algorithm involving the storage of partial parity data in the NVRAM as described in "Distributed Storage System Using Front-End And Back-End Locking," Serial No. 09/129,004, attorney docket no. AM9-98-007, incorporated by reference above.

CONCLUSION

This concludes the description of the preferred embodiments of the invention. The following describes some alternative embodiments for accomplishing the present invention.

In preferred embodiments, adaptors 8a, b, c interface the nodes 4a, b, c to allow sharing of storage resources. The adaptors 8a, b, c were described as having specific components, such as a processor 14a, b, c, NVRAM 16a, b, c, read cache 18a, b, c, write cache 20a, b, c, and battery unit 22a, b, c backing up the write cache 20a, b, c. In alternative embodiments, some or all the components of the adaptors 8a, b, c may be located elsewhere in the node 4a, b, c or share resources with the computer 6a, b, c. In yet further embodiments, there may be a central computing resource or node that monitors or controls intercommunication between the nodes 4a, b, c.

The logic of FIGS. 5a, b is for illustrative purposes. Additional or alternative steps may be performed in addition to those illustrated in the logic. Further, the order of the steps in the preferred logic may also vary. Still further, in preferred embodiments, all adaptors 8a, b, c in the network 12 would have the capability of implementing any of the above described logic, depending upon whether an adaptor 8a, b, c is the primary or secondary adaptor.

Preferred embodiments were described with respect to altering the structure of RAID arrays. However, the preferred embodiments could also be applied to altering different types of parity structures, other than RAID, with a primary adaptor and having a secondary adaptor shadow the primary adaptor to provide back-up in case the primary adaptor fails and to service input/output requests to data in the RAID structure being transformed.

Embodiments were described as altering parity groups within a range, such as altering half-the range, altering 100 parity groups, etc., before proceeding to a next range. These specific range values, e.g., half the range, 100 parity groups, 200 parity groups, etc. were described for illustrative purposes only and do not in any way limit the invention. Those skilled in the art will appreciate that alternative values than those described for processing the ranges may be used, e.g., a quarter of the range, 500 parity groups, 50 parity groups, etc.

In summary, preferred embodiments in accordance with the present invention provide a system for altering the structure of parity groups. A parity group consists of a set of data blocks and parity data for the data blocks. The data and parity data are stored in at least two storage devices. The first processing unit alters the parity structure of an Nth set of parity groups, wherein N is an integer value greater than or equal to zero. A set of parity groups includes at least one parity group. The second processing unit determines an Nth range of parity groups including the Nth set of parity groups. After detecting the failure of the first processing unit while altering the parity structure of the parity groups in the Nth set, the second processing unit processes the parity groups in the determined Nth range to determine a parity group whose parity structure was being altered when the first processing unit failed.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for altering a parity structure of parity groups, wherein a parity group consists of a set of data blocks and parity data for the data blocks, wherein the data and parity data are stored in at least two storage devices, comprising the steps of:

for each N, wherein N is an integer value greater than or equal to zero, performing the steps of:
   (i) altering with a first processing unit the parity structure of the Nth set of parity groups, wherein a set of parity groups includes at least one parity group;
   (ii) determining with the second processing unit an Nth range of parity groups including the Nth set of parity groups;
   (iii) detecting whether the first processing unit fails while altering the parity structure of the parity groups in the Nth range; and
   (iv) after determining that the first processing unit failed, processing with the second processing the parity groups in the determined Nth range to determine a parity group whose parity structure was being altered when the first processing unit failed.

2. The method of claim 1, wherein the step of altering the parity structure comprises at least one of changing a RAID level of the parity structure, adding a storage device to increase the storage capacity, and removing a storage device to decrease the storage capacity.

3. The method of claim 1, further comprising the step of the second processing unit altering the parity structure for the determined parity group whose parity structure was being altered when the first processing unit failed and parity groups whose parity structure was not altered by the first processing unit.

4. The method of claim 1, further comprising the step of transmitting with the first processing unit a message to the second processing unit indicating that the first processing unit will alter the structure of the Nth set of parity groups before the first processing unit alters the parity structure.

5. The method of claim 4, wherein the second processing unit determines the Nth range of parity groups after receiving the message from the first processing unit.

6. The method of claim 4, wherein the message the first processing unit sends to the second processing unit is a first message, further including the step of the second processing unit sending a second message to the first processing unit after determining the Nth range of parity groups, wherein the first processing unit performs the step of altering the parity structure of the Nth set of parity groups after receiving the second message.

7. The method of claim 6, further including the steps of:
receiving with the second processing unit a request for a data block;
determining with the second processing unit whether the requested data block is in the determined Nth range of parity groups; and
accessing the requested data block, with the second processing unit, to process the request after determining that the requested data block is in the determined Nth range of parity groups, wherein the second processing unit sends the second message to the first processing unit after accessing the requested data blocks.

8. The method of claim 6, further including the steps of:
maintaining with the second processing unit information on a first parity structure comprised of the parity structure before the first processing unit alters the parity structure and a second parity structure comprising the parity structure as altered by the first processing unit;
receiving with the second processing unit a request for a data block after sending the second message to the first processing unit;
determining with the second processing unit whether the requested data block is in the determined Nth range of parity groups being altered by the first processing unit;
accessing the requested data block with the second processing unit according to the information on the second parity structure after determining that the requested data block precedes the determined Nth range of parity groups;
accessing the requested data block with the second processing unit according to the information on the first parity structure after determining that the requested data block succeeds the determined Nth range of parity groups; and delaying accessing the requested data block after determining that the requested data block is within the determined range of parity groups until the parity structure of the parity group for the requested data block is altered to the second parity structure.

9. The method of claim 1, wherein the N sets of parity groups include a fixed number of parity groups, wherein prior to altering the structure of the Nth set of parity groups for N greater than zero, the second processing unit determines the Nth range of parity groups by incrementing a first limit number and a second limit number by the fixed number, wherein the Nth set of parity groups to be altered are included in the range defined by the incremented first and second limit numbers.

10. A system for altering the structure of parity groups, wherein a parity group consists of a set of data blocks and parity data for the data blocks;

a storage system storing the data and parity data; a first processing unit; a second processing unit;

a network providing communication among the storage system, the first processing unit, and the second processing unit;

a first memory device associated with the first processing unit, wherein the first memory device stores progress information indicating a parity group in an Nth set of parity groups, wherein N is an integer value greater than or equal to zero, wherein for each N, the first processing unit alters the parity structure of the Nth parity group indicated in the progress information; and a second memory device associated with the second processing unit, wherein the second memory device stores information on an Nth range of parity groups including the Nth set of parity groups, and wherein after detecting the failure of the first processing unit while altering the structure of a parity group in the Nth range of parity groups, the second processing unit processes the parity groups in the Nth range to determine the parity group whose structure was being altered when the first processing unit failed.

11. The system of claim 10, wherein the first processing unit includes means for altering the parity structure by performing at least one of changing a RAID level of the parity structure, adding a storage device to increase the storage capacity, and removing a storage device to decrease the storage capacity.

12. The system of claim 10, wherein after detecting the failure of the first processing unit, the second processing unit further includes means for altering the parity structure for the determined parity group whose parity structure was being altered when the first processing unit failed and parity groups whose parity structure was not altered by the first processing unit.

13. The system of of claim 10, further comprising program logic implemented in the first processing unit to transmit a message to the second processing unit indicating that the first processing unit will alter the structure of the Nth set of parity groups before the first processing unit alters the parity structure.

14. The system of claim 13, further comprising program logic implemented in the second processing unit to cause the second processing unit to determine the Nth range of parity groups to be altered after receiving the message from the first processing unit indicating that the parity structure of the Nth set of parity groups will be altered.

15. The system of claim 13, wherein the message the first processing unit sends to the second processing unit is a first message, wherein the program logic implemented in the second processing unit causes the second processing unit to send a second message to the first processing unit after determining the Nth range of parity groups, wherein the first processing unit performs the step of altering the parity structure of the Nth set of parity groups after receiving the second message.

16. The system of claim 15, wherein the program logic implemented by the second processing unit further causes the second processing unit to:

receive a request for a data block;

determine whether the requested data block is in the determined Nth range of parity groups; and access the requested data block from the storage system to process the request after determining that the requested data block is in the determined Nth range of parity groups, wherein the second processing unit sends the second message to the first processing unit after accessing the requested data blocks.

17. An article of manufacture for use in programming a first and second processing units to alter a parity structure of parity groups, wherein a parity group consists of a set of data blocks and parity data for the data blocks, wherein the data and parity data are stored in at least two storage devices, the article of manufacture comprising at least one computer readable storage device including at least one computer program embedded therein that causes the first and second processing units to perform the steps of:

for each N, wherein N is an integer value greater than or equal to zero, performing the steps of:

(i) altering with a first processing unit the parity structure of an Nth set of parity groups, wherein a set of parity groups includes at least one parity group;

(ii) determining with the second processing unit an Nth range of parity groups including the Nth set of parity groups;

(iii) detecting whether the first processing unit fails while altering the parity structure of the parity groups in the Nth range; and (iv) after determining that the first processing unit failed, processing with the second processing the parity groups in the determined Nth range to determine a parity group whose parity structure was being altered when the first processing unit failed.

18. The article of manufacture of claim 17, wherein the step of altering the parity structure comprises at least one of changing a RAID level of the parity structure, adding a storage device to increase the storage capacity, and removing a storage device to decrease the storage capacity.

19. The article of manufacture of claim 17, further comprising the step of the second processing unit altering the parity structure for the determined parity group whose parity structure was being altered when the first processing unit failed and parity groups whose parity structure was not altered by the first processing unit.

20. The article of manufacture of claim 17, further comprising the step of transmitting with the first processing unit a message to the second processing unit indicating that the first processing unit will alter the structure of the Nth set of parity groups before the first processing unit alters the parity structure.

21. The article of manufacture of claim 20, wherein the second processing unit determines the Nth range of parity groups after receiving the message from the first processing unit.

22. The article of manufacture of claim 20, wherein the message the first processing unit sends to the second processing unit is a first message, further including the step of the second processing unit sending a second message to the first processing unit after determining the Nth range of parity groups, wherein the first processing unit performs the step of altering the parity structure of the Nth set of parity groups after receiving the second message.

23. The article of manufacture of claim 22, further including the steps of:

receiving with the second processing unit a request for a data block;

determining with the second processing unit whether the requested data block is in the determined Nth range of parity groups; and accessing the requested data block, with the second processing unit, to process the request after determining that the requested data block is in the determined Nth range of parity groups, wherein the second processing unit sends the second message to the first processing unit after accessing the requested data blocks.

24. The article of manufacture of claim 22, further including the steps of:

maintaining with the second processing unit information on a first parity structure comprised of the parity structure before the first processing unit alters the parity structure and a second parity structure comprising the parity structure as altered by the first processing unit;

receiving with the second processing unit a request for a data block after sending the second message to the first processing unit;

determining with the second processing unit whether the requested data block is in the determined Nth range of parity groups being altered by the first processing unit;

accessing the requested data block with the second processing unit according to the information on the second parity structure after determining that the requested data block precedes the determined Nth range of parity groups;

accessing the requested data block with the second processing unit according to the information on the first parity structure after determining that the requested data block succeeds the determined Nth range of parity groups; and delaying accessing the requested data block after determining that the requested data block is within the determined range of parity groups until the parity structure of the parity group for the requested data block is altered to the second parity structure.

25. The article of manufacture of claim 17, wherein the N sets of parity groups include a fixed number of parity groups, wherein prior to altering the structure of the Nth set of parity groups for N greater than zero, the second processing unit determines the Nth range of parity groups by incrementing a first limit number and a second limit number by the fixed number, wherein the Nth set of parity groups to be altered are included in the range defined by the incremented first and second limit numbers.

* * * * *